United States Patent

Holliger

Patent Number: 4,820,309
Date of Patent: Apr. 11, 1989

[54] 1:2-CHROMIUM COMPLEX DYES FOR TANNED LEATHER

[75] Inventor: Herbert Holliger, Allschwil, Switzerland

[73] Assignee: Sandoz Ltd., Basel, Switzerland

[21] Appl. No.: 163,442

[22] Filed: Mar. 3, 1988

[30] Foreign Application Priority Data

Mar. 5, 1987 [DE] Fed. Rep. of Germany ....... 3707044

[51] Int. Cl.$^4$ ..................... D06P 3/32; C09B 45/00
[52] U.S. Cl. ........................... 8/437; 8/436;
8/641; 8/680; 8/685; 8/686; 8/687; 8/692;
534/696; 534/697; 534/698; 534/699; 534/701;
534/716; 534/723; 534/724
[58] Field of Search ............... 8/437, 641, 685, 686;
534/696, 698, 699, 701

[56] References Cited

U.S. PATENT DOCUMENTS

| 4,150,942 | 4/1979 | Holliger et al. ............... 8/437 |
| 4,358,287 | 11/1982 | Wicki et al. ............... 8/540 |
| 4,623,720 | 11/1986 | Holliger ............... 534/700 |

*Primary Examiner*—A. Lionel Clingman
*Attorney, Agent, or Firm*—Gerald D. Sharkin; Richard E. Vila; Melvyn M. Kassenoff

[57] ABSTRACT

Complexes of the formula

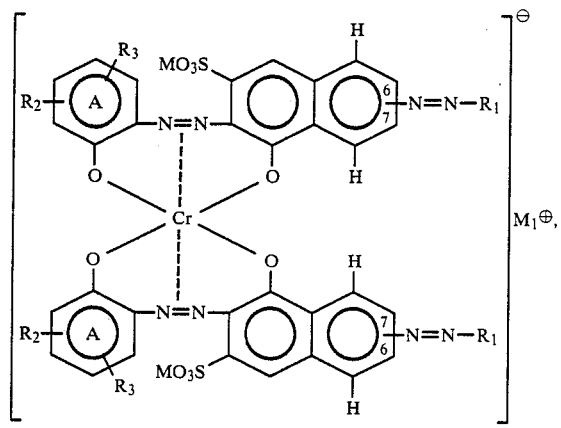

wherein each $R_1$ is independently (a) the radical of a coupling component of the active methylene non-cyclic or homocyclic series, (b) the radical of a coupling component of the heterocyclic series or (c) the radical of a coupling component of the monocyclic benzene series,
  with the proviso that at least one $R_1$ is the radical of a coupling component of the active methylene non-cyclic or homocyclic series,
each $R_2$ is independently hydrogen, $C_{1-4}$alkyl or $-SO_2NR_4R_5$,
each $R_3$ is independently hydrogen, halo, $C_{1-4}$alkyl or $-SO_2NR_4R_5$, and
each M and $M_1$ is independently hydrogen or a cation, wherein each $R_4$ is independently hydrogen, $C_{1-4}$alkyl or $C_{2-3}$hydroxyalkyl, and
  each $R_5$ is independently hydrogen, $C_{1-4}$alkyl, $C_{2-3}$hydroxyalkyl, cyclohexyl, cyclohexyl substituted by methyl, phenyl or phenyl substituted by methyl,
  with the proviso that at least one of Ring A and $R_1$ of each disazo ligand bears an $-SO_2NR_4R_5$ group,
and mixtures of such or containing such complexes, the use of such complexes and mixtures for dyeing substrates dyeable with anionic dyes (e.g., tanned leather and pelts), substrates dyed therewith, processes for synthesizing such complexes and mixtures and disazo compounds useful in their synthesis.

32 Claims, No Drawings

1:2-CHROMIUM COMPLEX DYES FOR TANNED LEATHER

The invention relates to novel 1:2 chromium complex dyes, their production and their use in particular as leather dyes; and to corresponding novel metallisable disazo compounds.

The invention provides 1:2-chromium complexes and complex mixtures of the formula

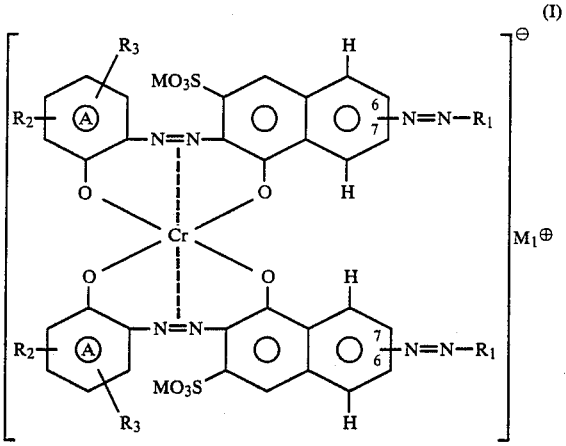

in which each $R_1$ independently signifies the radical of a coupling component selected from the group consisting of (a) coupling components of the methylene active non-cyclic or homocyclic series, (b) coupling components of the heterocyclic series and (c) coupling components of the monocyclic benzene series;

each $R_2$ independently is hydrogen, $C_{1-4}$-alkyl or —$SO_2NR_4R_5$, each $R_3$ independently is hydrogen, halogen, $C_{1-4}$-alkyl or —$SO_2NR_4R_5$, said $R_4$ independently is hydrogen, $C_{1-4}$-alkyl or $C_{2-3}$-hydroxyalkyl, each $R_5$ independently is hydrogen, $C_{1-4}$-alkyl, $C_{2-3}$-hydroxyalkyl, unsubstituted cyclohexyl, cyclohexyl which is substituted by methyl, unsubstituted phenyl or phenyl which is substituted by methyl, and M and $M_1$ signify independently hydrogen or a cation, with the provisos that:

(1) at least one of the radicals A and $R_1$ in each of the two ligands bears an $SO_2NR_4R_5$ group as substituent and (2) at least one of the two radicals $R_1$ is the radical of a coupling component (a), and their mixtures with 1:2-chromium complexes of the formula (I) in which each of the radicals $R_1$ independently signifies the radical of a coupling component (b) or (c).

$R_4$ is preferably $R'$, where $R'$ is hydrogen, $C_{1-2}$-alkyl or $C_{2-3}$-hydroxyalkyl.

$R_5$ is preferably hydrogen, $C_{1-2}$-alkyl, $C_{2-3}$-hydroxyalkyl or phenyl which is either unsubstituted or monosubstituted by methyl; more preferably $R_5$ is $R''$, where $R''$ is hydrogen, $C_{1-2}$-alkyl or $C_{2-3}$-hydroxyalkyl.

More preferably both of $R'$ and $R''$ are hydrogen.

$R_2$ is preferably —$SO_2NR_4R_5$ (in particular —$SO_2NR'R''$), $C_{1-2}$-alkyl or hydrogen, of which hydrogen is particularly preferred.

Halogen is preferably chlorine.

$R_3$ is preferably hydrogen, chlorine or —$SO_2NR_4R_5$ of which —$SO_2NR_4R_5$ is preferred; most preferably $R_3$ is —$SO_2NR'R''$.

Preferably only one of the two substituents $R_2$ and $R_3$ linked to the same ring A signifies a group —$SO_2NR_4R_5$, in particular —$SO_2NR'R''$, the other being most preferably hydrogen.

The substituents $R_2$ and $R_3$ on each ring A are preferably in two of the positions meta and para to the azo group. When a ring A bears only one group —$SO_2NR_4R_5$ it is preferably in para to the chromium-bound oxygen.

The radicals $R_1$ are preferably free of sulpho groups, carboxy groups and phosphonic acid groups.

The coupling components (a) are either homocyclic—namely cycloaliphatic—(e.g. 5,5-dimethylcyclohexane-1,3-dione) or preferably non-cyclic. Preferred coupling components of the methylene active non-cyclic series are acetoacetyl-substituted compounds, in which the acetoacetyl radical is preferably bound to $C_{1-4}$-alkyl, $C_{1-12}$-alkylamino or $C_{1-4}$-alkoxy or anilino, which is either unsubstituted or substituted on the phenyl ring by one or two substituents selected from the group consisting of chlorine, $C_{1-2}$-alkyl, $C_{1-2}$-alkoxy and —$SO_2NR_4R_5$. Preferably (a) is a coupling component of the formula $$CH_3—CO—CH_2—CO—R_0 \qquad (1)$$

in which $R_0$ is $C_{1-4}$-alkyl, $C_{1-4}$-alkoxy, $C_{1-12}$-alkylamino or anilino which is either unsubstituted or substituted on the phenyl ring by one or two substituents selected from the group consisting of chlorine, $C_{1-2}$-alkyl, $C_{1-2}$-alkoxy and —$SO_2NR_4R_5$.

Preferably $R_0$ contains not more than one —$SO_2NR_4R_5$ group.

The coupling components (b) of the heterocyclic series contain preferably one or two nitrogen atoms in the heterocycle and may contain one or two benzene rings. Preferably the heterocyclic coupling components contain a total of at most three rings, more preferably at most two rings.

The coupling components (c) of the monocyclic benzene series are such in which coupling takes place at only one benzene ring and if a further benzene ring is present in the molecule of this coupling component, no coupling takes place at this second benzene ring.

Preferred coupling components of the formula $H$-$R_1$ correspond to the following formulas:

(1)-preferably (1')-as (a);
(2), (3) or (4)-preferably (3)-as (b); and
(5) or (6)-preferably (6)-as (c);

the formulae (1') to (6) being as follows:

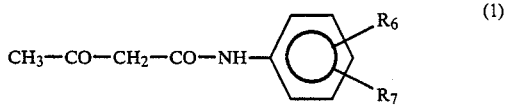

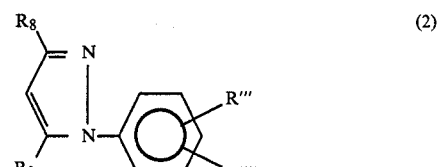

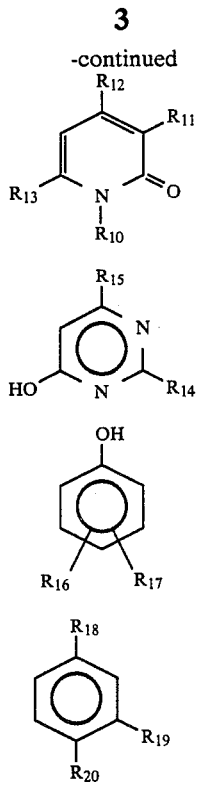

(3)

(4)

(5)

(6)

in which $R_6$ signifies hydrogen, $C_{1-2}$-alkyl, $C_{1-2}$-alkoxy or —$SO_2NR'R''$, $R_7$ signifies hydrogen, $C_{1-2}$-alkyl, $C_{1-2}$-alkoxy or chlorine, $R_8$ signifies $C_{1-4}$-alkyl or phenyl, $R_9$ signifies —OH or —$NH_2$, $R'''$ signifies hydrogen, chlorine, methyl, methoxy, —CN, —$NO_2$ or —$SO_2NR'R''$, $R''''$ signifies hydrogen, chlorine, methyl or methoxy, $R_{10}$ signifies hydrogen, —$NH_2$, phenylamino, $C_{1-4}$-alkyl, $C_{6-9}$-cycloalkyl, $C_{2-4}$-alkyl substituted by hydroxy, by $C_{1-2}$-alkoxy or by chlorine, or a radical of the formula

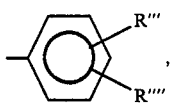

$R_{11}$ signifies hydrogen, —CN, —$CONH_2$ or —CO—$CH_3$, $R_{12}$ signifies hydrogen, methyl, hydroxy or phenyl, $R_{13}$ signifies hydrogen, hydroxy or methyl, $R_{14}$ and $R_{15}$ independently signify hydroxy or primary amino, $R_{16}$ signifies hydrogen, chlorine, $C_{1-4}$-alkyl, $C_{1-4}$-alkoxy or acetylamino, $R_{17}$ signifies hydrogen, chlorine or $C_{1-4}$-alkyl, $R_{18}$ signifies —OH or —NR'R'', $R_{19}$ signifies —OH, anilino, toluidino, acetylamino or —NR'R'' and $R_{20}$ signifies hydrogen, chlorine or $C_{1-4}$-alkyl, provided that at least one of $R_{12}$ and $R_{13}$ is hydroxy.

Of the $C_{1-4}$-alkyl and -alkoxy radicals occurring in the molecule, the lower-molecular representatives are preferred, in particular ethyl, ethoxy, methyl and methoxy of which methyl and methoxy are more preferred. In the hydroxyalkyl radicals the hydroxy group is preferably linked to the β-carbon atom (in particular as β-hydroxyethyl and β-hydroxypropyl). If $R_1$ is the radical of an acetoacetic acid-($C_{1-12}$-alkyl)amide the alkyl radical when containing 4–12 carbon atoms may be linear or preferably branched.

The cations M and $M_1$ may be any cations conventional in anionic metal complexes, for example ammonium and alkali metal cations [unsubstituted ammonium, mono-, di- or tri-($C_{1-2}$-alkyl)- or -($C_{2-3}$-hydroxyalkyl)-ammonium, lithium, sodium, potassium, preferably sodium].

The radicals of formula —N=N—$R_1$ are preferably in the 6-position of the relative naphthalene nucleus.

Of the 1:2-chromium complex compounds and mixtures of 1:2-chromium complex compounds those are preferred in which either all of the radicals $R_1$ are radicals of a coupling component of the methylene active non-cyclic series, in particular of formula (1), preferably (1') or some of the radicals $R_1$ are radicals of coupling components of the above mentioned methylene active non-cyclic series and the remaining radicals $R_1$ are radicals of coupling components H—$R_1'$ wherein H—$R_1'$ has the meaning of H—$R_1$ with the exception of (a); preferably —$R_1'$ is the radical of a coupling component of the benzene series (c), in particular such of the formula (6), in which $R_{20}$ signifies preferably hydrogen or methyl. In the preferred compounds of formula (6) one of $R_{18}$ and $R_{19}$ is hydroxy and the other hydroxy or, preferably, —$NH_2$; $R_{20}$ having most preferably hydrogen.

The molar ratio of the radicals $R_1$ of coupling components (a) to the radicals $R_1$ of the other series (b) and (c) in the 1:2-chromium complexes and complex mixtures of the invention is preferably within 100:0 to 10:90, more preferably in the range of 80:20 to 20:80, most preferably 60:40 to 40:60; in symmetrical complexes both radicals $R_1$ being such of the series (a) (i.e. molar ratio 100:0) and in asymmetrical complexes, the one radical $R_1$ being of the series (a) and the other being either also a radical of the series (a) which is different from the former (i.e. also molar ratio 100:0) or of the series (b) or (c) (i.e. molar ratio 50:50).

Of the above 1:2-chromium complexes and complex mixtures the 1:2 chromium complex mixtures are preferred.

The chromium complex compounds of the invention may be synthetised in known manner suitably by chromation, diazotizing and coupling of corresponding starting materials. The 1:2-chromium complexes and -complex mixtures of the invention are in particular produced by (α) chromation of one or more compounds of the formula

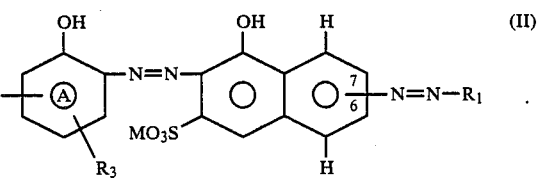

(II)

to obtain 1:2-chromium complexes —$R_1$ being the radical of a coupling component (a) in at least some of compounds of the formula (II) or (β) coupling the bisdiazo compound of a 1:2-chromium complex compound of the formula

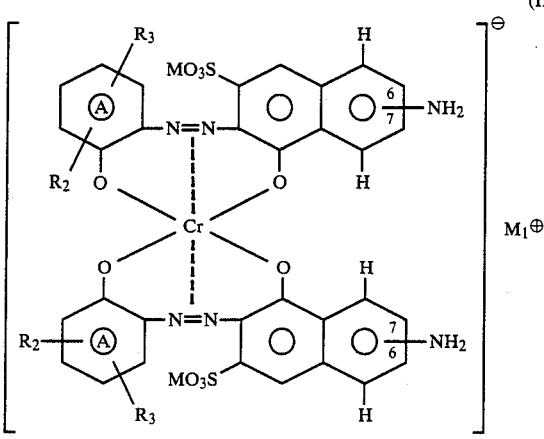

or a mixture of such bisdiazo compounds to a coupling component of the formula H—R₁ or to a mixture of coupling components of the formula H—R₁, at least some of the compounds HR₁ being of type (a).

1:2-Chromium complex mixtures may also be produced by plain mixing of the corresponding single components and/or partial mixtures thereof.

The compounds of formula (II) may be produced by coupling of the diazo compounds of an amine of formula

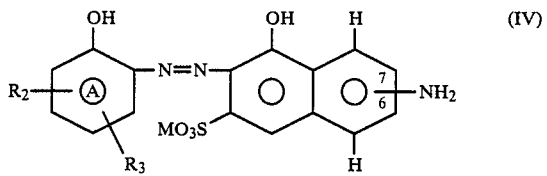

to a coupling component or a mixture of coupling components of formula H—R₁. The chromium-complexes of the formula (III) may be produced by chromation of compounds of formula (IV), simultaneously or subsequently up to the 1:2-chromium complex stage.

The compounds of formula (IV) may be produced by coupling the diazo compound of an amine of the formula

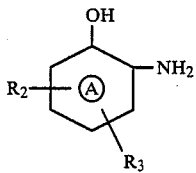

to a compound of the formula

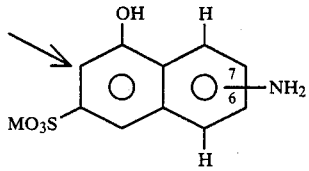

under alkaline conditions.

Diazotization and coupling reactions may be carried out in conventional manner. The coupling to the compounds of formula (VI) is carried out under alkaline conditions; the coupling to coupling components of the formula H—R₁ may be carried out in weakly acidic to clearly alkaline medium optionally in the presence of a coupling activator, advantageously in the pH range of 4–11 and at temperatures in the range from −5° to +80° C., preferably 0° C. to 50° C. in aqueous or aqueous/organic medium.

For the chromation of the compounds of formulae (IV) and (II) there may be employed conventional chromium compounds, e.g. chromium trichloride, chromium trifluoride, chromic sulphate, chromic acetate, potassium chromium sulphate or ammonium chromium sulphate, optionally with addition of a reducing agent, e.g. glucose, as well as sodium or potassium chromate or bichromate. The chromation may be carried out directly up to the 1:2-chromium complex stage or by degrees over the 1:1-chromium complex stage and then further complexation up to the 1:2-chromium complex stage. Chromation may be carried out in aqueous medium, preferably at pH-values in the range of 2–10 and at temperatures in the range of 95°–130° C., if necessary under superatmospheric pressure. Optionally the reaction may be carried out with addition of organic solvents or also only in organic solvents. Suitable organic solvents are preferably such that are miscible with water, have a boiling point above 100° C. and in which the azo dyes and the metal salts are soluble, e.g. glycols, ether alcohols or amides (e.g. ethylene glycol, polyethylene glycol, β-ethoxyethanol, β-methoxyethanol, formamide or dimethylformamid). For the production of asymmetrical 1:2-chromium complex compounds the chromation may be carried out gradually synthesizing first the 1:1-chromium complex of one of the complexants and from this with a second complexant than the 1:2-complex. The 1:1-chromium complexes may be produced in conventional manner, e.g. under analogous conditions as for the 1:2-chromium complexes but preferably under stronger acidic pH-values, advantageously at pH<3.

It is also of advantage to synthesize 1:2-chromium mix-complexes by simultaneously metallizing different complexants of formula (II) or (IV) or by coupling the bis-diazo compounds of compounds of formula (III) or mixtures of coupling components HR₁. By this there may also be produced mixtures of 1:2-chromium complexes that contain compounds of formula (I) in which at least one R₁ is a radical of a coupling component (a) in admixture with 1:2-chromium complexes of formula (I) in which the radicals R₁ are exclusively such of the series (b) and/or (c).

Preference is given to 1:2-chromium complex mixtures in particular mix-complexes as obtainable according to the above described production variations (α) or preferably (β) and in which the ligands in metal-free form correspond to the formulae

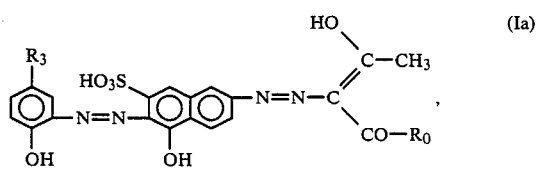

and

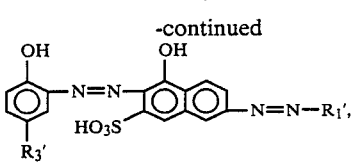

wherein $R_1'$ has one of the significances of $R_1$ with the exception of (a)
and $R_3'$ has one of the significances of $R_3$.

The occurring 1:2-chromium complexes of disazo dyes being in particular such of the formula

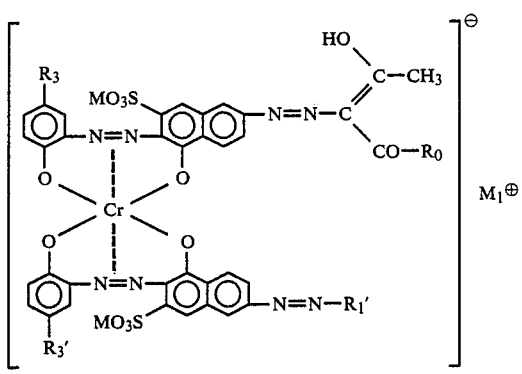

preferably together with such of formula

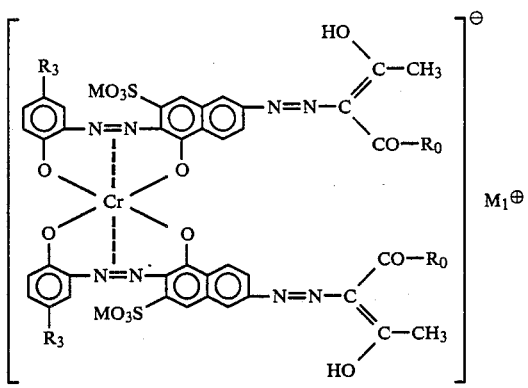

and/or of formula

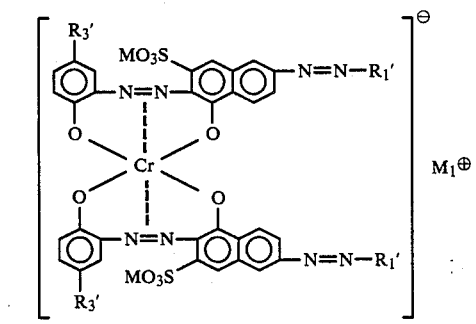

The 1:2-chromium complexes and complex mixtures produced as described above may be isolated from the reaction mixture in conventional manner, e.g. by acidification and/or salting out and filtration. The dyes may be blended with conventional blending agents, e.g. sodium chloride, sodium sulphate, sodium carbonate or dextrine or may be worked up in conventional manner to a granulate form or to concentrated liquid dye compositions.

The 1:2-chromium complex compounds of the invention are suitable as dyes for substrates that are dyeable with anionic dyes; they may be employed as single dyes or also as dye mixtures with each other or even with other dyes. With the 1:2-chromium complexes and complex mixtures of formula (I), in particular, the ones in which between the radicals $R_1$ the ones of the methylene active non-cyclic series [in particular radicals of compounds of formula (1)] preponderate, there may be obtained dyeings in deep, dark, in particular black shades, particularly when any further groups $R_1$ are radicals of coupling components of the benzene series [preferably radicals of compounds of formula (6)]. There may, thus, be obtained, e.g. greenish black and blue black to reddish black and in particular also deep black leather-dyeings. The 1:2-chromium complex dyes of the invention are also eminently suitable as combination element, together with dyes of other shades but with similar tinctorial behaviour; the latter are mainly to be found between the dyes with a similar size of the molecule and a similar, in particular equal, number of acid groups (optionally in salt form). Preferred combination elements are the dyes described in U.S. Pat. No. 4,623,720 and GB Pat. No. 2,059,986 which are incorporated herein by reference.

Any substrate that is dyeable with anionic dyes is suitable as a substrate that may be dyed with the chromium complexes of the invention; these include natural and regenerated cellulose, polyurethanes, basically modified high polymers (e.g. basically modified polypropylene), natural or synthetic polyamides or anodised aluminum, in particular, however, leather substrates. The substrate to be dyed may be in any conventional form, e.g. in the form of loose fibres, filaments, yarns, woven or knitted goods, non-woven webs, carpets, half-ready-made and ready-made soft goods and tanned leather or pelts. The dyes may be employed in any desired concentration up to the saturation of the substrate. The dyeing may be carried out by any conventional method that is suitable for the substrate to be dyed, e.g. by exhaustion or impregnation methods (e.g. padding or printing), preferably from aqueous medium; for synthetic substrates, the dye may optionally also be incorporated into the synthetic mass. Paper may be dyed in the pulp or after sheet formation.

The dyes of the invention are, however, mainly suitable for the dyeing of leather and pelts.

Any kinds of leather which are conventionally dyed from aqueous medium are suitable, particularly grain leather (e.g. nappa from sheep, goat or cow, and boxleather from calf or cow) suede leather (e.g. velours from sheep, goat or calf and hunting leather), split velours (e.g. from cow or calf skin), bukskin and nubuk leather; further also wool-bearing skins and furs (e.g. fur-bearing suede leather). The leather may have been tanned by any conventional tanning method, in particular vegetable, mineral synthetic or combined tanned (e.g. chrome tanned, zirconyl tanned, aluminium tanned or semi-chrome tanned). If desired, the leather may also be re-tanned; for re-tanning there may be used any tanning agent conventionally employed for re-tanning, e.g. mineral, vegetable or synthetic tanning agents [e.g. chromium, zirconyl or aluminium derivatives, oak, quebracho, chestnut or mimosa extracts, aromatic syntans, polyurethanes (co)polymers of (meth)acrylic acid compounds or melamine/, dicyanodiamide/ and/or urea/-formaldehyde resins].

The leathers may be of various thicknesses, thus, there may be used very thin leathers, such as book-binder's leather or glove-leather (nappa), leather of medium thickness, such as shoe upper leather, garment leather and leather for handbags or also thick leathers, such as shoe-sole leather, furniture leather, leather for suitcases, for belts and for sport articles; hair-bearing leathers and furs may also be used. After tanning (in particular after a retanning) and before dyeing, the pH of the leather is advantageously set to values in the range of 4–8 (the leather is "neutralised"); depending on the kind of the leather, there may be chosen an optimum pH range, e.g. for grain leather pH values in the range of 4–6, for suede leather and split velours and for very thin leathers pH-values in the range of 4.5 to 8.0 and for intermediately dried suede leathers and intermediately dried split velours, the pH may range in the range of 5–8.0. For the adjustment of the pH-value of the leather there may be employed conventional assistants; for tanned leather of acidic character the pH may be adjusted by addition of suitable bases, e.g. ammonia, ammonium bicarbonate or alkali metal salts of weak acids, e.g. sodium formate, sodium acetate, sodium bicarbonate, sodium carbonate or sodium bisulfite, of which sodium formate and ammonia are preferred. Sodium carbonate and sodium bicarbonate are usable in particular as second bases for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se suitably in an aqueous medium and under conventional temperature and pH conditions, e.g. in the temperature range of 20°–80° C., preferably 25°–70° C., milder temperature conditions, in particular in the range of 25°–40° C., being preferred for the achievement of deeper penetrations and for the dyeing of wool-bearing skins and furs. The pH-values of the dye-bath may, in general, range broadly; mainly from pH 9 to pH 3; in general the dyeing may be advantageously begun at higher pH-values and concluded at lower pH-values. Preferably the dyeing is carried out at pH-values $\geq 4$, in particular in the range of 9–4 and for the conclusion of the dyeing procedure the pH-value is lowered (e.g. by addition of an acid conventional in the leather dyeing technique such as acetic acid or formic acid) preferably to values in the range between 4 and 3. The dye concentration may range broadly, if desired, up to the saturation degree of the substrate, e.g. up to 5%, referred to the wet weight of the substrate. The dyeing may be carried out in one or more stages, e.g. in two stages, optionally with insertion of charge reversal of the substrate by means of conventional cationic assistants. If desired, the dyeing may be carried out in the presence of a dyeing assistant; these are mainly conventional non-ionic or anionic producers (in particular hydrophilic surfactants, preferably hydrophilic polysaccharide derivatives, polyoxyethylated alkyl phenols, lignosulphonates or sulpho-group containing aromatic compounds). Since the dyes of the invention distinguish by their surprisingly good fastness to acids, neither the dyeing procedure nor the dyeing are impaired by any required acid addition during the dyeing or also afterwards (the obtained dyeings are e.g. also suitable as substrates for after-treatments and finishings under acidic conditions).

A fatting may, if desired, be carried out before and/or after the dyeing process, in particular also in the same liquor. For fatting after the dyeing process the fatting agent is advantageously added before the pH of the liquor is lowered, preferably to values between 3 and 4.

For the fatting (in particular fat-liquoring) step there may be used any conventional natural animal, vegetable or mineral fat, fat oil, wax, resin or resin-oil or chemically modified animal or vegetable fat or oil, which include in particular tallow, fish oils, neats-foot oil, olive oil, castor oil, rapeseed oil, linseed oil, wood oil, cottonseed oil, sesame oil, corn oil and japanese tallow and chemically modified products thereof (e.g. hydrolysis, transesterification, oxidation, hydrogenation or sulphonation products), bees-wax, chinese wax, carnauba wax, montan wax, wool fat, colophony, birch oil, shellack, mineral oils with boiling range within 300° and 370° C. (particularly the so-called "heavy alkylates"), soft paraffin, medium paraffin, hard paraffin, vaseline, ceresin and methyl esters of $C_{14-22}$-fatty acids; and synthetic leather fatting agents, including esters, in particular esters of polybasic acids (e.g. phosphoric acid) with optionally oxyethylated fatty alcohols. Of the above mentioned the methyl ester, the sulphonation products and the phosphoric acid partial esters are particularly preferred. By the term "sulphonation" for the fatting agents, there is meant generally the introduction of the sulpho group including also the formation of a sulphato group (="sulphating") and the introduction of a sulpho group by reaction with a sulphite or $SO_2$ (="sulphiting").

A conventional leather softener, in particular a cationic leather softener may, if desired, be applied in a final step, particularly if fatting has been carried out with a sulphonated fat-liquoring agent.

The treated substrate may then be further treated in conventional manner, e.g. rinsed or washed, drained, dried and cured.

The 1:2-chromium complex dyes of the invention are, especially in the form of their alkali metal salts, readily soluble in water; they display surprisingly good fastness to acids and are distinguished especially on leather by their good-build up, good penetration dyeings of the leathers being also obtainable. The dyeings particularly on leather, have excellent fastness properties, for example wet-fastnesses, fastness to rubbing and above all fastness to acids, light-fastness and stability to PVC-migration are to be pointed out. There may be obtained very level, deep, fine, dark, in particular also black dyeings, grain side and velours side being very evenly dyed; in admixture with corresponding dyes with which the dyes of the invention are combinable, there may also be obtained very deep and regular dyeings of high yield and optimum fastnesses.

In the following examples parts and percentages are, if not otherwise stated, by weight; the temperatures are indicated in °C. and parts by volume relate to parts by weight as ml to g.

EXAMPLE 1

43.8 parts of the monoazo dye obtained by alkaline coupling of diazotised 2-amino-1-hydroxybenzene-4-sulphonic acid amide to 2-amino-5-hydroxynaphthalene-7-sulphonic acid are suspended in 1000 parts of water, 12 parts of chromium-III-acetate are added and the mixture is stirred at a pH of 4.5 to 4.8 and at 100° C.;

the end-point of the chromation is determined by thin-layer chromatography. When the chormation is completed the mixture is cooled to 10° C., acidified by addition of 35 parts of 30% aqueous hydrochloric acid solution and diazotized by dropwise addition of 28 parts by volume of 4-normal sodium nitrite solution. On completion of the diazotization reaction the excess nitrite is reacted with a little amino-sulphonic acid. A solution of 17.7 parts of acetoacetic acid anilide in 100 parts by volume of 1-normal sodium hydroxide solution are then added, the pH is adjusted to 10 by addition of sodium hydroxide solution of 30% concentration and kept for two hours at this value. After lowering the pH value to 7 by addition of 30% hydrochloric acid the dye is salted out with sodium chloride, suction filtered, dried and ground and is obtained in form of the sodium salt as a black powder.

The dyestuff dyes leather in a regular black shade with good light fastness and stability to migration into polyvinyl chloride.

The obtained chromium complex corresponds in the form of the free acid to the formula

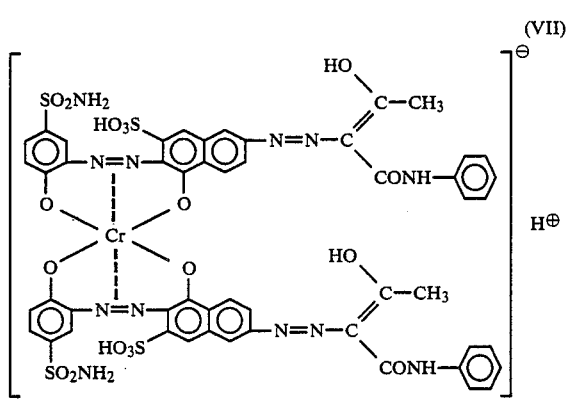

(VII)

The chromium mix-complex contains the following three components in the form of the sodium salts: the chromium-complex of the formula

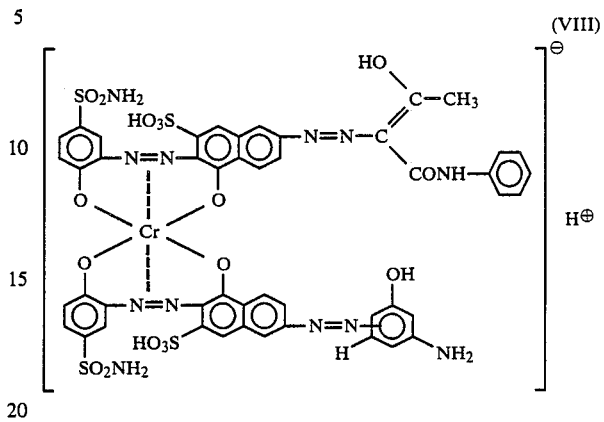

(VIII)

the chromium-complex of the formula

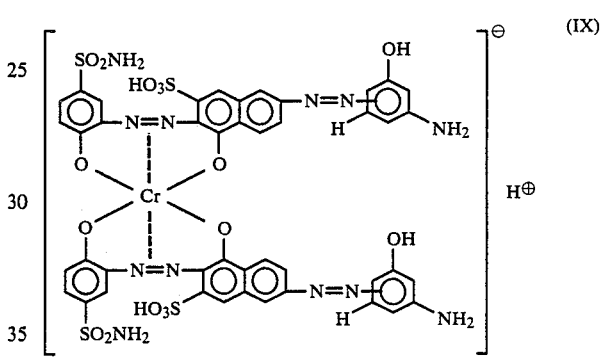

(IX)

and the chromium-complex of the formula (VII).

EXAMPLE 2

43.8 parts of the monoazo dye obtained by alkaline coupling of diazotised 2-amino-1-hydroxybenzene-4-sulphonic acid amide to 2-amino-5-hydroxynaphthalene-7-sulphonic acid are suspended in 800 parts of water, 12 parts of chromium-III-acetate are added thereto and the mixture is stirred for 2 hours at a pH-value of 4.5 to 4.8 at 120° C. under super-atmospheric pressure. After completion of the chromation the mixture is cooled to 10° C., acidified by addition of 35 parts of an aqueous hydrochloric acid solution of 30% concentration and treated with 28 parts by volume of 4-normal sodium nitrite solution for diazotization. On completion of the diazotization reaction the excess nitrite in excess is reacted with a little amino-sulphonic acid. A solution of 8.9 parts of acetic acid anilide and 5.5 parts of 1-amino-3-hydroxybenzene in 100 parts by volume of 1-normal sodium hydroxide solution are then added, the pH is set to 10 by addition of 30% aqueous sodium hydroxide solution and maintained for 2 hours at this value. The pH-value is then lowered to 7 by addition of 30% aqueous hydrochloric acid solution and the dye is salted-out with sodium chloride, suction filtered, dried and ground and is obtained in the form of the sodium salt as a black powder.

The dyestuff dyes leather in a regular black shade with good light-fastness and stability to migration into polyvinyl chloride.

EXAMPLE 3

43.8 parts of the monoazo dye obtained by alkaline coupling of diazotised 2-amino-1-hydroxybenzene-4-sulphonic acid amide to 2-amino-5-hydroxy-naphthalene-7-sulphonic acid are suspended in 1000 parts of water, treated with 45 parts of an aqueous hydrochloric acid solution of 30% concentration and diazotised by dropwise addition of 27 parts of 4-normal sodium nitrite solution. When the diazotization reaction is completed the nitrite in excess is reacted with a little aminosulphonic acid. A solution of 17.7 parts of acetoacetic acid anilide in 100 parts by volume of 1-normal sodium hydroxide solution is then added, the pH is adjusted to 10 by addition of 30% aqueous sodium hydroxide solution and maintained for 2 hours at this value. 12 parts of chromium-III-acetate are then added and the suspension is stirred at a pH of 4.5 to 4.8 at 100° C.; the end point of the chromation reaction is determined by thin-layer chromatography. When the chromation is completed the pH value is lowered to 7 by addition of 30% aqueous sodium hydroxide solution. By salting out with sodium chloride, suction filtration, drying and grinding, the sodium salt of the dye of formula (VII) is obtained in the form of black powder.

The following table contains further 1:2-chromium complex dyes of the invention which may be synthetised analogously to the above Examples 1–3 and correspond to formulae (I') to (I''') in which M and $M_1$ signify sodium. The dyes identified by "SK" are symmetrical 1:2-chromium complexes of the formula (I″) which are synthetised as described in Example 1 or Example 3: the dyes identified by "MK" are 1:2-chromium-complex mixtures of the formulae (I′), (I″) and (I‴), synthetised analogously as described in Example 2; in the last column of the table there is indicated the shade of the leather dyeings as obtainable by the Application Examples A to E below.

| Example no. | Complex | $R_3$ | $R_o$ | $R_3'$ | $R_1'$ | Shade on Leather |
|---|---|---|---|---|---|---|
| 4 | MK | —SO$_2$NH$_2$ | 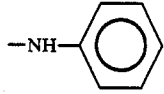 —NH—C$_6$H$_5$ | —SO$_2$NH$_2$ | 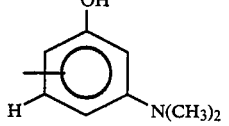 OH, N(CH$_3$)$_2$ | Black |
| 5 | MK | " | " | " | 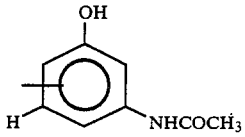 OH, NHCOCH$_3$ | Black |
| 6 | MK | " | " | " | 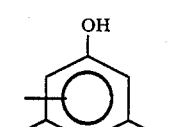 OH, OH | Black |
| 7 | MK | " | " | " | 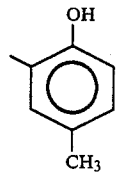 OH, CH$_3$ | Black |
| 8 | SK | " | 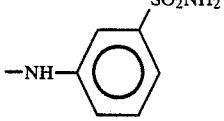 —NH—C$_6$H$_4$—SO$_2$NH$_2$ | — | — | Greenish Black |
| 9 | MK | " | " | —SO$_2$NH$_2$ | 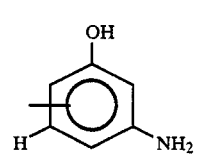 OH, NH$_2$ | Black |
| 10 | SK | " | 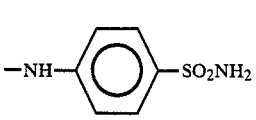 —NH—C$_6$H$_4$—SO$_2$NH$_2$ | — | — | Greenish Black |
| 11 | MK | " | " | —SO$_2$NH$_2$ | 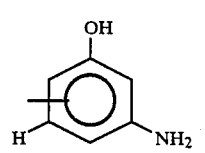 OH, NH$_2$ | Black |
| 12 | SK | Cl | 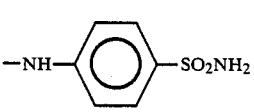 —NH—C$_6$H$_4$—SO$_2$NH$_2$ | — | — | Greenish Black |
| 13 | MK | Cl | " | Cl | 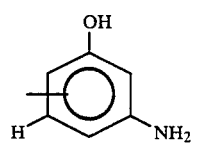 OH, NH$_2$ | Black |

| Example no. | Complex | $R_3$ | $R_o$ | $R_3'$ | $R_1'$ | Shade on Leather |
|---|---|---|---|---|---|---|
| 14 | SK | $-SO_2NH_2$ | $-NH-CH_2-\underset{\underset{CH_2-CH_3}{\mid}}{CH}-(CH_2)_3-CH_3$ | — | — | Black |
| 15 | MK | " | " | $-SO_2NH_2$ | 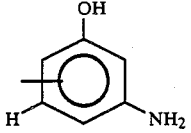 | Black |

APPLICATION EXAMPLE A 100 parts of a wet blue bovine box side leather are washed in a dyeing drum with 300 parts of water at 40° C. After 10 minutes the leather is retanned in a fresh bath of 100 parts of water at 40° C., 1 part of a 50% solution of a highly oxyethylated tallow fatty amine and 4 parts of a 40% solution of dimethyloldihydroxyethylene urea for 30 minutes: The leather is then washed with 300 parts of water at 35° C. for 5 minutes and then it is treated for 10 minutes with 200 parts of water at 35° C. and 0.3 parts of sodium formate, 0.7 parts of sodium hydrogen carbonate are then added and neutralisation is continued for 20 minutes (pH value: in the cut edge 4.7 and in the bath 5.8). The leather is then washed with 300 parts of water at 35° C. for 10 minutes and then dyed with 0.4 parts of the mix-complex produced according to Example 2 which is dissolved in 250 parts of water of 55° C. After 20 minutes 5 parts of a 60% emulsion of a sulfited fish-oil are added for fatting and fatting is continued for 30 minutes. Then the bath is acidified with formic acid of 8.5% concentration and drumming is continued for 10 minutes (end pH in the bath 3.5). The liquor is then drained off and the leather is rinsed, drained and cured in conventional way. There is obtained a leather dyed in a level black shade with good fastnesses.

APPLICATION EXAMPLE B 100 parts of an intermediately dried chrome-tanned sheep nappa are wetted back in a dyeing drum with 700 parts of water at 50° C., 1 part of a 25% ammonia solution and 0.1 part of the adduct of 10 moles of ethylene oxide to 1 mole of nonylphenol. After 60 minutes the bath is drained off and the leather is pre-dyed with 1.6 parts of the mix-complex produced according to Example 2 dissolved in 500 parts of water at 55° C., and 1 part of a 25% ammonia solution for 50 minutes; 8 parts of formic acid of 8.5% concentration are added for acidification and drumming is continued for 15 minutes. 0.8 parts of the mix-complex produced according to Example 2 which are dissolved in 50 parts of water are then added and overdyeing is continued for 30 minutes; formic acid of 8.5% concentration is added stepwise for acidification and drumming is continued for 40 minutes (final pH in the bath: 3.5). The leather is rinsed, drained and cured as conventional. There is obtained a leather dyed in a level black shade with good fastnesses.

APPLICATION EXAMPLE C 100 parts of an intermediately dried chrome-tanned split velours are wetted-back with 500 parts of water at 50° C., 2 parts of a 25% ammonia solution and 0.1 part of the adduct of 10 moles of ethylene oxide to 1 mole of nonylphenol for 60 minutes; the bath is then drained off and 300 parts of water at 60° C. and 1 part of a 25% ammonia solution are added. After 10 minutes of drumming, 2 parts of the mix-complex produced according to Example 2 dissolved in 40 parts of water are added for pre-dyeing. After 60 minutes 7 parts of an 8.5% formic acid solution are added and drumming is continued for further 20 minutes; further 2 parts of the dye produced according to Example 2 which are dissolved in 40 parts of water are added and overdyeing is continued for 30 minutes; the bath is then acidified stepwise with formic acid of 8.5% concentration and drumming is continued for 30 minutes (end pH in the bath: 3.5). The leather is then rinsed, drained and cured as usual. There is obtained a leather dyed in a level black shade of good fastnesses.

APPLICATION EXAMPLE D 100 parts of intermediately dried wet blue bovine furniture-leather are wetted back with 800 parts of water at 50° C., 2 parts of 25% ammonia solution and 0.2 parts of the adduct of 10 moles of ethylene oxide to 1 mole of nonylphenol. After 90 minutes the liquor is drained off and the leather is treated for 15 minutes with 400 parts of water at 40° C., 1.5 parts of a 25% ammonia solution and 1 part of a 65% solution of the condensation product of phenol and sulphuric acid (phenolic syntan). The leather is then pre-dyed by addition of 1.6 parts of the mix-complex produced according to Example 2 which is dissolved in 40 parts of water for about 90 minutes until penetration-dyeing is attained; 10 parts of 8.5% formic acid solution are added and drumming is continued for 10 minutes: 2 parts of a 20% solution of the product obtained by benzylation and quaternization with dimethylsulphate of diethylenetriamine are added and the treatment is continued for 20 minutes. The bath is drained off and overdyeing is carried out with 0.8 parts of the dye produced according to Example 2 which is dissolved in 400 parts of water at 50° C. for 40 minutes after which the bath is stepwise acidified with formic acid of 8.5% concentration and drumming is continued for 20 minutes (final pH in the bath: 3.5). The leather is then rinsed, drained and cured as conventional. There is obtained a leather dyed in a level black shade with good fastnesses.

APPLICATION EXAMPLE E 100 parts of an intermediately dried calf-leather which has previously been chrome/synthetically tanned and retanned with a phenolic syntan are wetted back with 1000 parts of water at 50° C. and 0.1 parts of the adduct of 10 moles of ethylene oxide to 1 mole of nonylphenol. After 90 minutes the bath is drained off and 1 part of the mix-complex produced according to Example 2 which is dissolved in 1000 parts of water at 50° C. is added. After 60 minutes drumming the bath is acidified with formic acid of 8.5% concentration and drumming is continued for 45 minutes (final pH in the bath: 3.5). The bath is then drained off and the leather after having been rinsed and drained is cured as usual. There is obtained a leather dyed in a level black shade with good fastnesses.

APPLICATION EXAMPLE F

The procedure of Application Example E is repeated with the difference that instead of 1 part of the mix-complex produced according to Example 2 there is employed a mixture of 0.5 parts of the mix-complex produced according to Example 2 and 0.5 parts of the medium brown dye C.I. Acid Brown 432. There is obtained a level dark brown leather-dyeing in which the penetration-dyed portion of the leather section is regularly dyed dark brown.

By repeating Application Example F with the difference that in place of 0.5 parts of the medium brown dye C.I. Acid Brown 432 there are employed 0.5 parts of the medium brown dye C.I. Acid Brown 425 or 0.5 parts of the yellow dye C.I. Acid Yellow 243 there are also obtained level leather dyeings in corresponding mixed shades in which the penetration dyed portion of the leather section is regularly dyed.

By repeating the dyeing procedures described in Examples A to F but employing any one of the dyes of Examples 1 (or 3), 4, 5, 6, 7, 8, 9, 10, 11, 12, 13, 14 and 15 in place of the dye of Example 2 there are obtained dyeings of the shades indicated in Examples 1, 2 and 4–15 for Application Examples A to E and in corresponding mixed shades for Application Example F.

I claim:

1. A complex of the formula

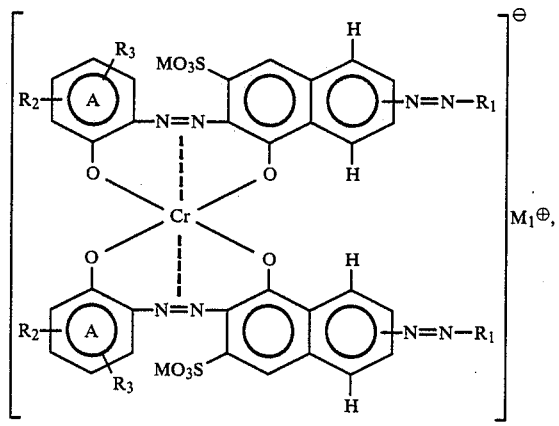

wherein each $R_1$ is independently (a) the radical of a coupling component of the active methylene non-cyclic or homocyclic series, (b) the radical of a coupling component of the heterocyclic series or (c) the radical of a coupling component of the monocyclic benzene series, with the proviso that at least one $R_1$ is the radical of a coupling component of the active methylene non-cyclic or homocyclic series, each $R_2$ is independently hydrogen, $C_{1-4}$alkyl or $-SO_2NR_4R_5$, each $R_3$ is independently hydrogen, halo, $C_{1-4}$alkyl or $-SO_2NR_4R_5$, and each M and $M_1^\oplus$ is independently hydrogen or a cation, wherein each $R_4$ is independently hydrogen, $C_{1-4}$alkyl or $C_{2-3}$hydroxyalkyl, and each $R_5$ is independently hydrogen, $C_{1-4}$alkyl, $C_{2-3}$hydroxyalkyl, cyclohexyl, cyclohexyl substituted by methyl, phenyl or phenyl substituted by methyl, with the proviso that at least one of Ring A and $R_1$ of each diasazo ligand bears an $-SO_2NR_4R_5$ group, a mixture of such complexes or a mixture of such a complex or mixture of complexes with at least one complex of the formula

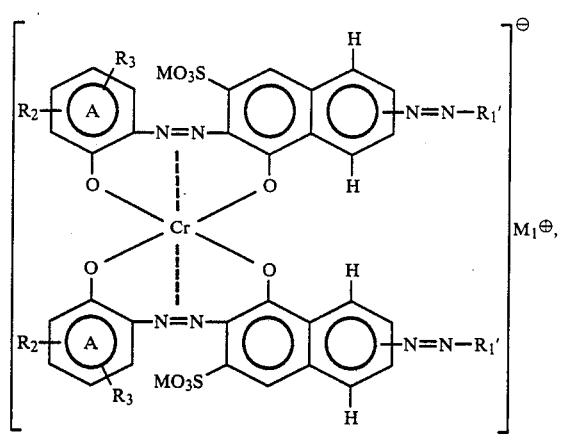

wherein each $R'_1$ is independently (b) the radical of a coupling component of the heterocyclic series or (c) the radical of a coupling component of the monocyclic benzene series, and each $R_2$, $R_3$, M and $M_1^\oplus$ is as defined above, with the proviso that at least one of Ring A and $R'_1$ of each diasazo ligand bears an $-SO_2NR_4R_5$ group.

2. A complex according to claim 1.

3. A complex according to claim 2 wherein each radical of a coupling component of the active methylene non-cyclic or homocyclic series is the radical of a coupling component of the formula $CH_3-CO-CH_2-CO-R_o$, wherein $R_o$ is $C_{1-4}$alkyl, $C_{1-4}$alkoxy, $C_{1-12}$alkylamino, anilino or anilino the phenyl ring of which is substituted by 1 or 2 substituents selected from the group consisting of chloro, $C_{1-2}$alkyl, $C_{1-2}$alkoxy and $-SO_2NR_4R_5$.

4. A complex according to claim 2 wherein each $R_1$ is independently the radical of a coupling component of the formula

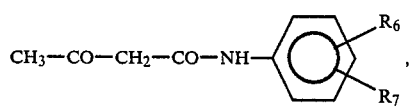

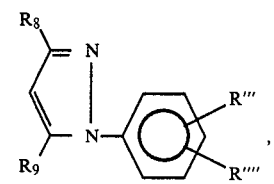

-continued

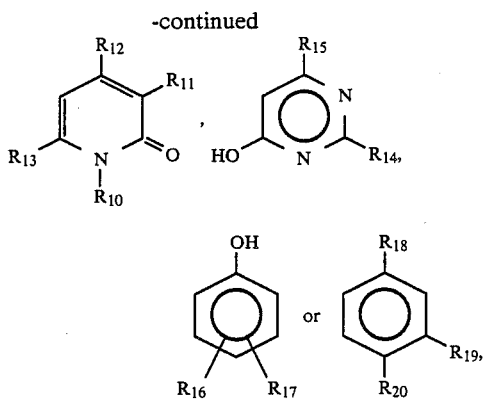

wherein R₆ is hydrogen, $C_{1-2}$alkyl, $C_{1-2}$-alkoxy or —SO₂NR'R",

R₇ is hydrogen, $C_{1-2}$alkyl, $C_{1-2}$-alkoxy or chloro,

R₈ is $C_{1-4}$alkyl or phenyl,

R₉ is hydroxy or amino,

R₁₀ is hydrogen; amino; phenylamino; $C_{1-4}$alkyl; $C_{6-9}$cycloalkyl; $C_{2-4}$-alkyl substituted by hydroxy, $C_{1-2}$alkoxy or chloro; or

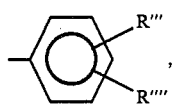

R₁₁ is hydrogen, cyano, carbamoyl or acetyl,

R₁₂ is hydrogen, methyl, hydroxy or phenyl,

R₁₃ is hydrogen, hydroxy or methyl, with the proviso that at least one of R₁₂ and R₁₃ is hydroxy, each of R₁₄ and R₁₅ is independently hydroxy or amino, R₁₆ is hydrogen, chloro, $C_{1-4}$alkyl, $C_{1-4}$alkoxy or acetamido, R₁₇ is hydrogen, chloro or $C_{1-4}$alkyl, R₁₈ is hydroxy or —NR'R", R₁₉ is hydroxy, anilino, toluidino, acetamido or —NR'R", with the proviso that R₁₉ is other than acetamido when R₁₈ is hydroxy, and R₂₀ is hydrogen, chloro or $C_{1-4}$alkyl, wherein each R' is independently hydrogen, $C_{1-2}$alkyl or $C_{2-3}$-hydroxyalkyl, each R" is independently hydrogen, $C_{1-2}$alkyl or $C_{2-3}$hydroxyalkyl, each R''' is independently hydrogen, chloro, methyl, methoxy, cyano, nitro or —SO₂NR'R", wherein R' and R" are as defined above, and each R'''' is independently hydrogen, chloro, methyl or methoxy.

5. A complex according to claim 4 wherein each M and $M_1^\oplus$ is independently hydrogen, lithium, sodium, potassium, ammonium, $C_{1-2}$alkylammonium, di-($C_{1-2}$alkyl)ammonium, tri-($C_{1-2}$alkyl)ammonium, $C_{2-3}$-hydroxyalkylammonium, di-($C_{2-3}$hydroxyalkyl)ammonium or tri-($C_{2-3}$hydroxyalkyl)ammonium.

6. A complex according to claim 5 wherein each M and $M_1^\oplus$ is independently hydrogen or sodium.

7. A complex according to claim 3 wherein each R₁ is independently the radical of a coupling component of the formula CH₃—CO—CH₂—CO—R₀.

8. A complex according to claim 7 having the formula

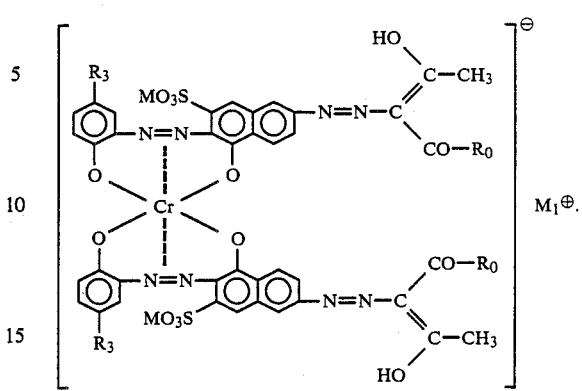

9. A complex according to claim 8 wherein each R₀ is

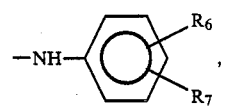

wherein R₆ is hydrogen, $C_{1-2}$alkyl, $C_{1-2}$alkoxy or —SO₂NR'R", and

R₇ is hydrogen, $C_{1-2}$alkyl, $C_{1-2}$alkoxy or chloro, and each R₃ is —SO₂NR'R", wherein each R' is independently hydrogen, $C_{1-2}$alkyl or $C_{2-3}$hydroxyalkyl, and each R" is independently hydrogen, $C_{1-2}$alkyl or $C_{2-3}$hydroxyalkyl, with the privosos that the two R₀'s are identical, and the two R₃'s are identical.

10. The complex according to claim 9 having the formula

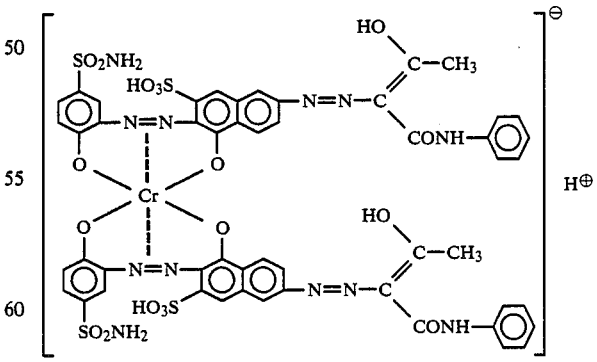

in sodium salt form.

11. A mixture of complexes according to claim 1 comprising (i) at least one complex of the formula

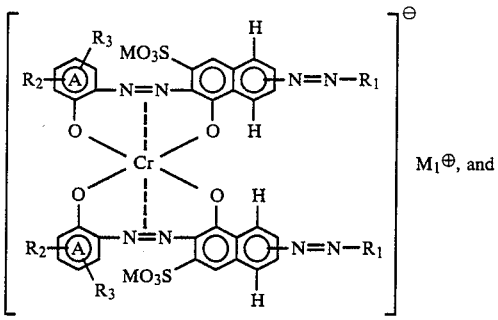
$M_1^\oplus$, and (ii) at least one complex of the formula

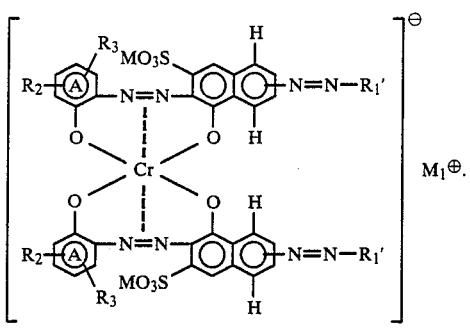
$M_1^\oplus$.

12. A mixture of complexes according to claim 11 wherein each radical of a coupling component of the active methylene non-cyclic or homocyclic series is the radical of a coupling component of the formula $CH_3$—$CO$—$CH_2$—$CO$—$R_o$, wherein $R_o$ is $C_{1-4}$alkyl, $C_{1-4}$alkoxy, $C_{1-12}$alkylamino, anilino or anilino the phenyl ring of which is substituted by 1 or 2 substituents selected from the group consisting of chloro, $C_{1-2}$alkyl, $C_{1-2}$alkoxy and —$SO_2NR_4R_5$.

13. A mixture of complexes according to claim 12 wherein each $R_1$ is independently the radical of a coupling component of the formula

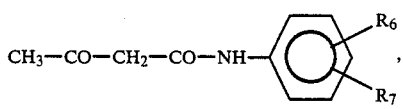

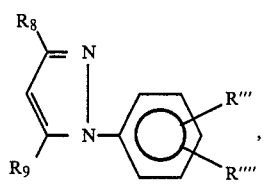

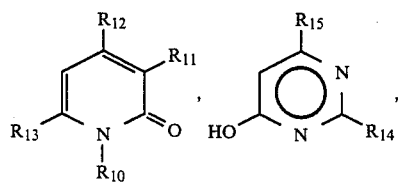

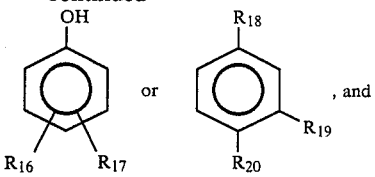

each $R'_1$ is independently the radical of a coupling component of the formula

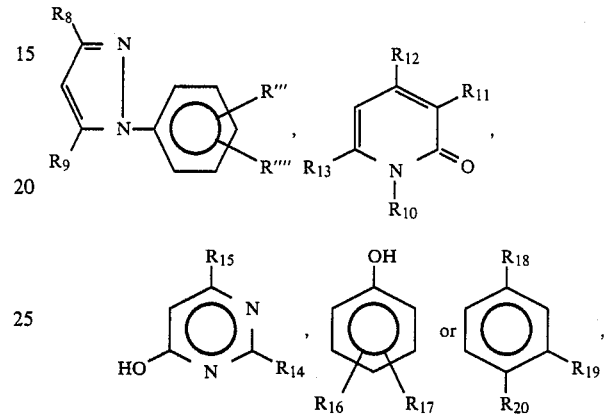

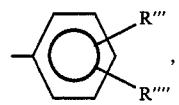

wherein $R_6$ is hydrogen, $C_{1-2}$alkyl, $C_{1-2}$alkoxy or —$SO_2NR'R''$, $R_7$ is hydrogen, $C_{1-2}$alkyl, $C_{1-2}$alkoxy or chloro, $R_8$ is $C_{1-4}$alkyl or phenyl, $R_9$ is hydroxy or amino, $R_{10}$ is hydrogen; amino; phenylamino; $C_{1-4}$alkyl; $C_{6-9}$cycloalkyl; $C_{2-4}$alkyl substituted by hydroxy, $C_{1-2}$alkoxy or chloro; or

[structure]

$R_{11}$ is hydrogen, cyano, carbamoyl or acetyl, $R_{12}$ is hydrogen, methyl, hydroxy or phenyl, $R_{13}$ is hydrogen, hydroxy or methyl, with the proviso that at least one of $R_{12}$ and $R_{13}$ is hydroxy, each of $R_{14}$ and $R_{15}$ is independently hydroxy or amino, $R_{16}$ is hydrogen, chloro, $C_{1-4}$alkyl, $C_{1-4}$alkoxy or acetamido, $R_{17}$ is hydrogen, chloro or $C_{1-4}$alkyl, $R_{18}$ is hydroxy or —$NR'R''$, $R_{19}$ is hydroxy, anilino, toluidino, acetamido or —$NR'R''$, with the proviso that $R_{19}$ is other than acetamido when $R_{18}$ is hydroxy, and $R_{20}$ is hydrogen, chloro or $C_{1-4}$alkyl, wherein each $R'$ is independently hydrogen, $C_{1-2}$alkyl or $C_{2-3}$hydroxyalkyl, each $R''$ is independently hydrogen, $C_{1-2}$alkyl or $C_{2-3}$hydroxyalkyl, each $R'''$ is independently hydrogen, chloro, methyl, methoxy, cyano, nitro or —$SO_2NR'R''$, wherein R' and R" are as defined above, and each R"" is independently hydrogen, chloro, methyl or methoxy.

14. A mixture of complexes according to claim 13 wherein each M and $M_1^\oplus$ is independently hydrogen, lithium, sodium, potassium, ammonium, $C_{1-2}$alkylammonium, di-($C_{1-2}$alkyl)ammonium, tri-($C_{1-2}$alkyl)ammonium, $C_{2-3}$hydroxyalkylammonium, di-($C_{2-3}$hydroxyalkyl)ammonium or tri-($C_{2-3}$hydroxyalkyl)ammonium.

15. A mixture of complexes according to claim 14 wherein each M and $M_1^\oplus$ is independently hydrogen or sodium.

16. A mixture of complexes according to claim 12 comprising at least one complex of the formula

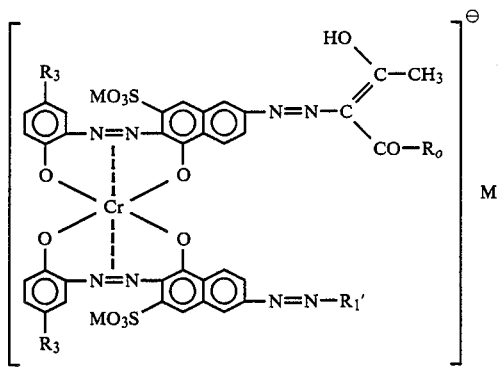 $M_1^\oplus$ and at least one complex selected from those of the formulae

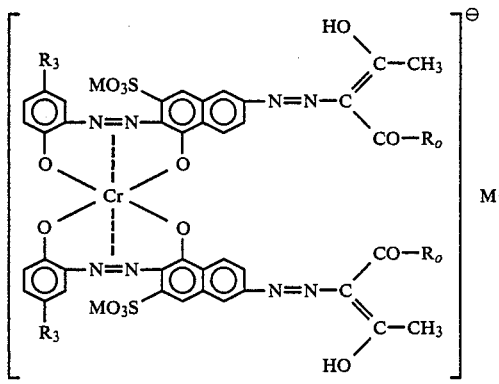 $M_1^\oplus$ and

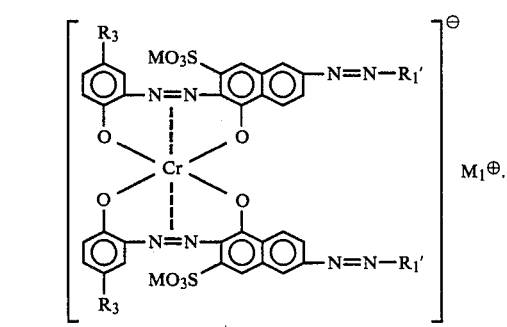 $M_1^\oplus$.

17. A mixture of complexes according to claim 16 wherein each $R_o$ is independently

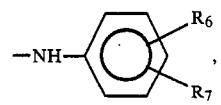

wherein $R_6$ is hydrogen, $C_{1-2}$alkyl, $C_{1-2}$-alkoxy or —$SO_2NR'R''$, and $R_7$ is hydrogen, $C_{1-2}$alkyl, $C_{1-2}$-alkoxy or chloro, each $R'_1$ is independently the radical of a coupling component of the formula

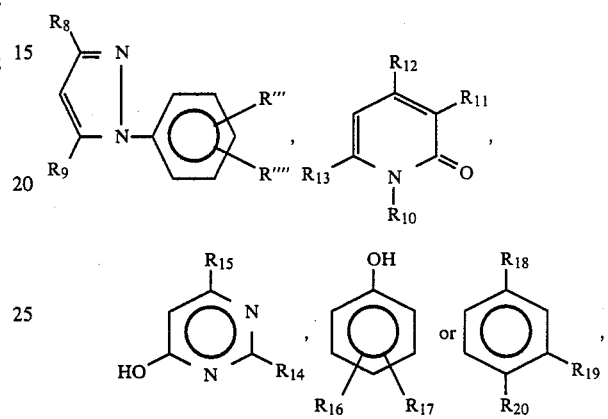

wherein $R_8$ is $C_{1-4}$alkyl or phenyl,
$R_9$ is hydroxy or amino,
$R_{10}$ is hydrogen; amino; phenylamino; $C_{1-4}$alkyl; $C_{6-9}$cycloalkyl; $C_{2-4}$alkyl substituted by hydroxy, $C_{1-2}$alkoxy or chloro; or

$R_{11}$ is hydrogen, cyano, carbamoyl or acetyl,
$R_{12}$ is hydrogen, methyl, hydroxy or phenyl,
$R_{13}$ is hydrogen, hydroxy or methyl, with the proviso that at least one of $R_{12}$ and $R_{13}$ is hydroxy,
each of $R_{14}$ and $R_{15}$ is independently hydroxy or amino,
$R_{16}$ is hydrogen, chloro, $C_{1-4}$alkyl, $C_{1-4}$alkoxy or acetamido,
$R_{17}$ is hydrogen, chloro or $C_{1-4}$alkyl,
$R_{18}$ is hydroxy or —NR'R",
$R_{19}$ is hydroxy, anilino, toluidino, acetamido or —NR'R", with the proviso that $R_{19}$ is other than acetamido when $R_{18}$ is hydroxy, and
$R_{20}$ is hydrogen, chloro or $C_{1-4}$alkyl, and
each $R_3$ is independently —$SO_2NR'R''$, wherein each R' is independently hydrogen, $C_{1-2}$alkyl or $C_{2-3}$hydroxyalkyl,
each R" is independently hydrogen, $C_{1-2}$alkyl or $C_{2-3}$hydroxyalkyl,
each R'" is independently hydrogen, chloro, methyl, methoxy, cyano, nitro or —$SO_2NR'R''$,
wherein R' and R" are as defined above, and each R"" is independently hydrogen, chloro, methyl or methoxy.

18. A mixture of complexes according to claim 17 wherein the molar ratio of the coupling component radicals of the active methylene non-cyclic or homocyclic series to the other coupling component radicals is 80:20 to 20:80.

19. A mixture of complexes according to claim 18 wherein said molar ratio is 60:40 to 40:60.

20. A mixture of complexes according to claim 19 wherein said molar ratio is 50:50.

21. A mixture of complexes according to claim 17 containing
(i) the complex of the formula

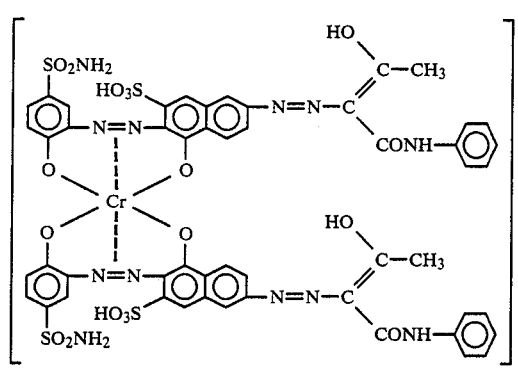

in sodium salt form,
(ii) a complex of the formula

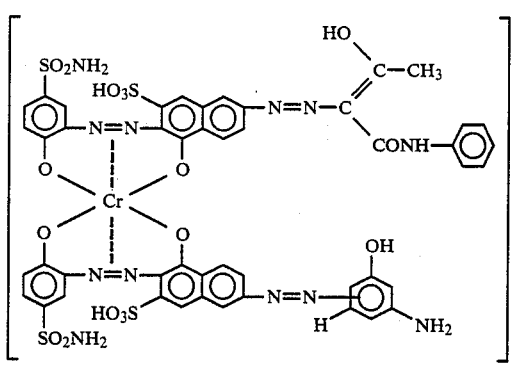

in sodium salt form, and
(iii) a complex of the formula

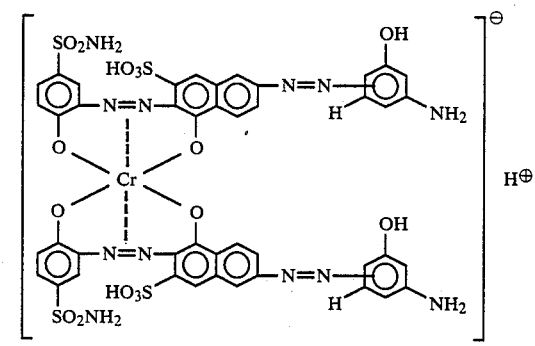

in sodium salt form.

22. A process for dyeing a substrate dyeable with anionic dyes comprising applying to a substrate dyeable with anionic dyes a complex or mixture of complexes according to claim 1.

23. A process according to claim 22 wherein the substrate is a tanned leather or pelt.

24. A process according to claim 22 wherein said complex or mixture of complexes is applied to the substrate together with at least one dye having another shade and a similar tinctorial behavior.

25. A substrate dyed by a process according to claim 22.

26. A tanned leather or pelt according to claim 25.

27. A process for synthesizing a complex or mixture of complexes according to claim 1 comprising ($\alpha$) chromating at least one compound of the formula

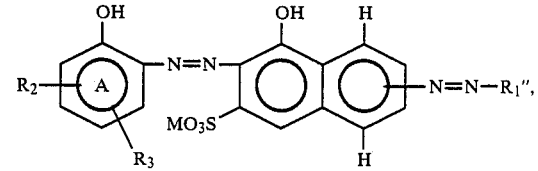

or a mixture of at least one compound of said formula and at least compound of the formula

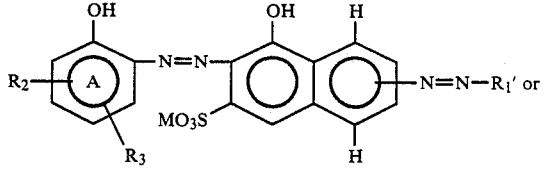

($\beta$) bidiazotizing a complex of the formula

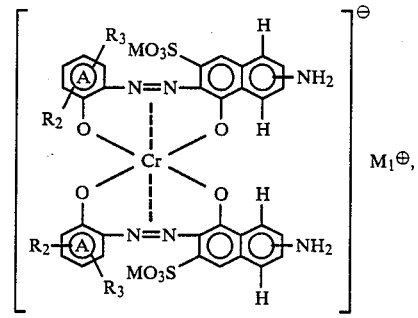

or a mixture of such complexes, and
coupling the bisdiazotized complex, or mixture of bisdiazotized complexes, with a coupling component of the formula H—$R_1$, or a mixture of coupling components of the formula H—$R_1$ at least one of which is a coupling component of the formula H—$R_1''$,
wherein each $R_1''$ is independently the radical of a coupling component of the active methylene non-cyclic or homocyclic series.

28. A mixture of complexes synthesized by a process according to claim 27.

29. A mixture of complexes according to claim 28 wherein the molar ratio of the coupling component radicals of the active methylene non-cyclic or homocyclic series to the other coupling component radicals is 80:20 to 20:80.

30. A mixture of complexes according to claim 29 wherein said molar ratio is 60:40 to 40:60.

31. A mixture of complexes according to claim 30 wherein said molar ratio is 50:50.

32. A compound of the formula

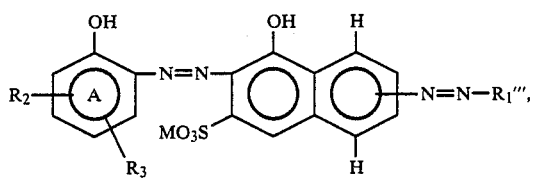

wherein $R_1'''$ is the radical of a coupling component of the active methylene non-cyclic or homocyclic series,
$R_2$ is hydrogen, $C_{1-4}$alkyl or $-SO_2NR_4R_5$,
$R_3$ is hydrogen, halo, $C_{1-4}$alkyl or $-SO_2NR_4R_5$, and
M is hydrogen or a cation,
wherein each $R_4$ is independently hydrogen, $C_{1-4}$alkyl or $C_{2-3}$hydroxyalkyl, and
each $R_5$ is independently hydrogen, $C_{1-4}$alkyl, $C_{2-3}$-hydroxyalkyl, cyclohexyl, cyclohexyl substituted by methyl, phenyl or phenyl substituted by methyl,
with the proviso that at least one of Ring A and $R_1$ bears an $-SO_2NR_4R_5$ group.

* * * * *